United States Patent [19]

Pellegrino et al.

[11] Patent Number: 5,231,564
[45] Date of Patent: Jul. 27, 1993

[54] POWER SUPPLY FOR PRODUCING EXCITATION VOLTAGE FOR AN X-RAY TUBE FILAMENT

[75] Inventors: Anthony J. Pellegrino, New Fairfield; Earl C. Mayes, Brookfield; Donald E. Sharpe, Woodbury; George H. Bantz, New Canaan, all of Conn.

[73] Assignee: Lorad Corporation, Danbury, Conn.

[21] Appl. No.: 859,999

[22] Filed: Mar. 30, 1992

[51] Int. Cl.⁵ .................... H02M 7/10; H05G 1/10
[52] U.S. Cl. ........................ 363/61; 378/101; 378/102
[58] Field of Search ................. 363/59, 60, 61; 378/101, 102, 104, 109, 110, 111, 112

[56] References Cited

U.S. PATENT DOCUMENTS

| | | |
|---|---|---|
| 2,256,859 | 9/1941 | Bouwers . |
| 3,611,032 | 10/1971 | Skillcorn . |
| 4,393,441 | 7/1983 | Enge . |
| 4,418,421 | 11/1983 | Kitadate . |
| 4,443,843 | 4/1984 | Ikeda . |
| 4,720,844 | 1/1988 | Bougle . |
| 4,930,145 | 5/1990 | Sherwin . |
| 5,023,768 | 6/1991 | Collier . |
| 5,060,253 | 10/1991 | Jedlitschka . |

OTHER PUBLICATIONS

W. Wills, Electronic Design, vol. 13, Jun. 21, 1974, pp. 64-68.
M. Buechel, High Voltage Multipliers in TV Receivers, no date.

*Primary Examiner*—Emanuel T. Voeltz
*Attorney, Agent, or Firm*—Ware, Fressola, Van Der Sluys & Adolphson

[57] ABSTRACT

A power supply for producing excitation of an X-ray tube filament of an unusually lightweight and readily portable X-ray machine is achieved through the use of multiple voltage multiplying-rectifying stages powered by a transformer driven at 25 kHz. A four amp-four volt electrical current is applied across the X-ray tube filament by the use of a multi-stage filament transformer array driven at 33 kHz. The multi-stage filament transformer array is interconnected to the multiple voltage multiplying-rectifying stage so as to limit the voltage potential between stages. The use of 25 kHz and 33 kHz driving signals eliminates cross talk between signal producing circuits.

8 Claims, 13 Drawing Sheets

POWER SUPPLY FOR PRODUCING EXCITATION VOLTAGE FOR AN X-RAY TUBE FILAMENT

This invention relates to unusually lightweight portable X-ray machines of the kind used in industrial noninvasive inspection for defects, discontinuities, voids or cracks in manufactured products or machines such as aircraft fuselages, jet aircraft engines or other products. More particularly, this invention relates to such portable X-ray units which may be conveniently stored and moved over long distances, and deployed in the field with ease and convenience to perform such X-ray examination of vehicles, tanks, piping, structures, machines or other devices at successive different locations.

BACKGROUND OF THE INVENTION

Conventional portable X-ray equipment is heavy, bulky and inconvenient to move and deploy for use because the high voltage required to operate the X-ray tube customarily requires extremely large and heavy electrical components to provide the desired stepped up direct current driving voltage for the X-ray tube. For this reason, operation of X-ray inspection equipment in the field has involved considerable inconvenience for the user. Consequently, a significant need has developed for lightweight, portable X-ray inspection equipment which can be readily stored, transported, deployed and used at successive different field locations.

BRIEF SUMMARY OF THE INVENTION

The devices of the present invention have proved highly useful in providing ample X-ray radiation for inspection purposes in the field, while requiring extremely lightweight and convenient control circuitry and cooling unit subassemblies, all easily portable. The electrical circuitry and systems incorporated in the devices of this invention are believed to exemplify several unique features and the use of a 22–28 kHz input signal for a multiple stage voltage multiplier, producing a 160 kV DC output voltage, achieves unexpectedly smooth DC output with no more than 1% variation in voltage. The precise DC voltage produced at the X-ray filament is controlled within close tolerances, utilizing unique control circuitry and a voltage divider feedback loop.

In parallel with the multiple-stage multiplier is a multiple-stage filament transformer array producing very low amperage AC filament heating output currents for the X-ray tube filament. The array allows the use of a narrow X-ray tube housing. By operating at 30–36 kHz, very lightweight transformer stages are employed in this filament transformer array, and circuit noise or cross talk between the high voltage DC multiplier stages and the filament transformer stages are reduced to a minimum or virtually eliminated.

By utilizing this multiple-stage, preferably a five-stage filament transformer, maximum voltage between the primary and secondary windings of each transformer stage is limited to 32 kV, thus reducing the dielectric volume and weight of the insulation between transformer windings. In the same manner, the five-stage voltage multiplier also limits the voltage between successive stages to 32 kV, permitting minimum size, volume and weight of insulation and capacitive dielectric material employed in the voltage multiplier components.

The secondary winding of each filament transformer stage, inductively coupled to the primary winding of the next succeeding stage, has its DC potential matched to that produced by the corresponding stage of the DC voltage multiplier, by being connected to the interstage junction of the multiplier.

Accordingly, a principal object of the present invention is to provide a power supply circuit for a lightweight and highly effective X-ray inspection unit which is easily stored, transported, deployed and used in the field at different successive inspection sites.

A further object of the invention is to provide a power supply circuit for an X-ray inspection unit having an X-ray tubehead mounted on an easily moved portable stand and connected to portable control and portable cooling portions of the assembly by cables and cooling liquid conduits.

Another object of the invention is to provide a power supply circuit for such portable X-ray inspection units incorporating X-ray tubeheads which are unusually, compact, small and comparatively light in weight.

Another object of the invention is to provide a power supply circuit for such portable X-ray inspection units capable of providing high voltage DC operating potential for the X-ray tube in the neighborhood of 160 kV with minimum voltage variations.

Still another object of the invention is to provide a power supply circuit for such portable X-ray inspection units that exhibits minimum cross talk or interference between the filament heating AC voltage applied to the filament of the X-ray tube, and the high voltage DC operating potential applied between cathode and anode of the X-ray tube.

Still another object of the invention is to provide such portable X-ray inspection units having lightweight power supply and filament transformer circuitry enclosed together with the X-ray tube in a compact tubehead of comparatively small size and light weight.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

THE DRAWINGS

For a fuller understanding of the nature and objects of the invention, reference should be made to the following detailed description taken in connection with the accompanying drawings, in which.

DETAILED DESCRIPTION OF THE INVENTION

Figure 1A:
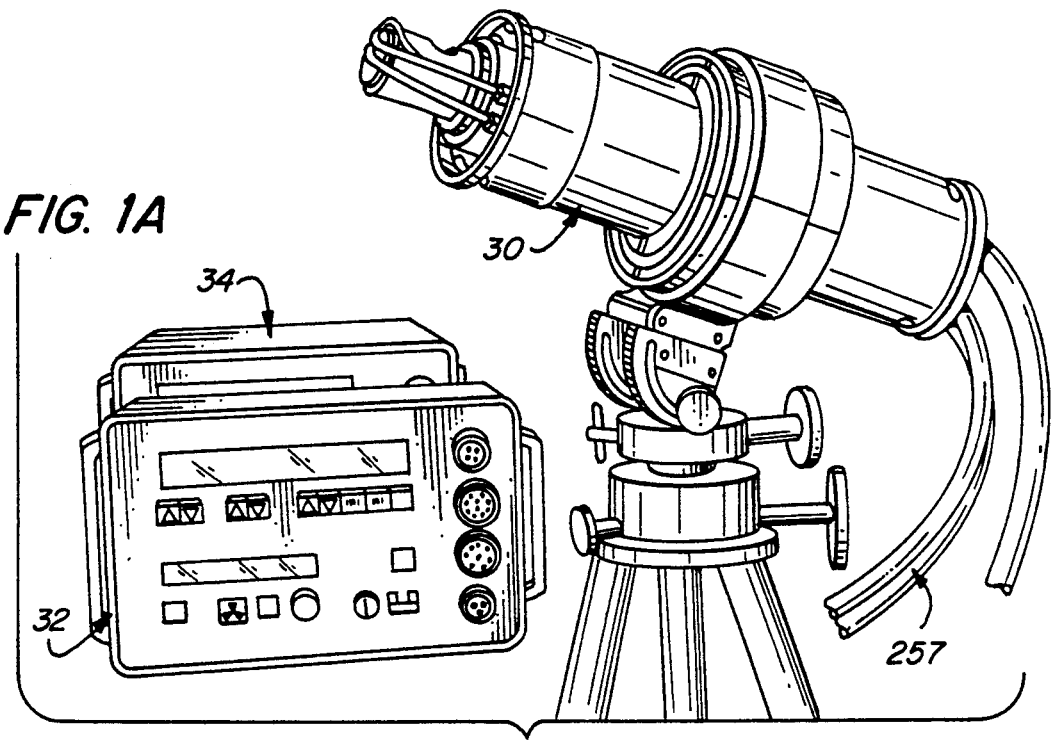
FIG. 1A is a perspective view showing a portable X-ray inspection unit of the present invention including a lightweight X-ray tubehead mounted on a tripod stand with a power supply control unit and a cooling unit in the background.
Figure 1B:
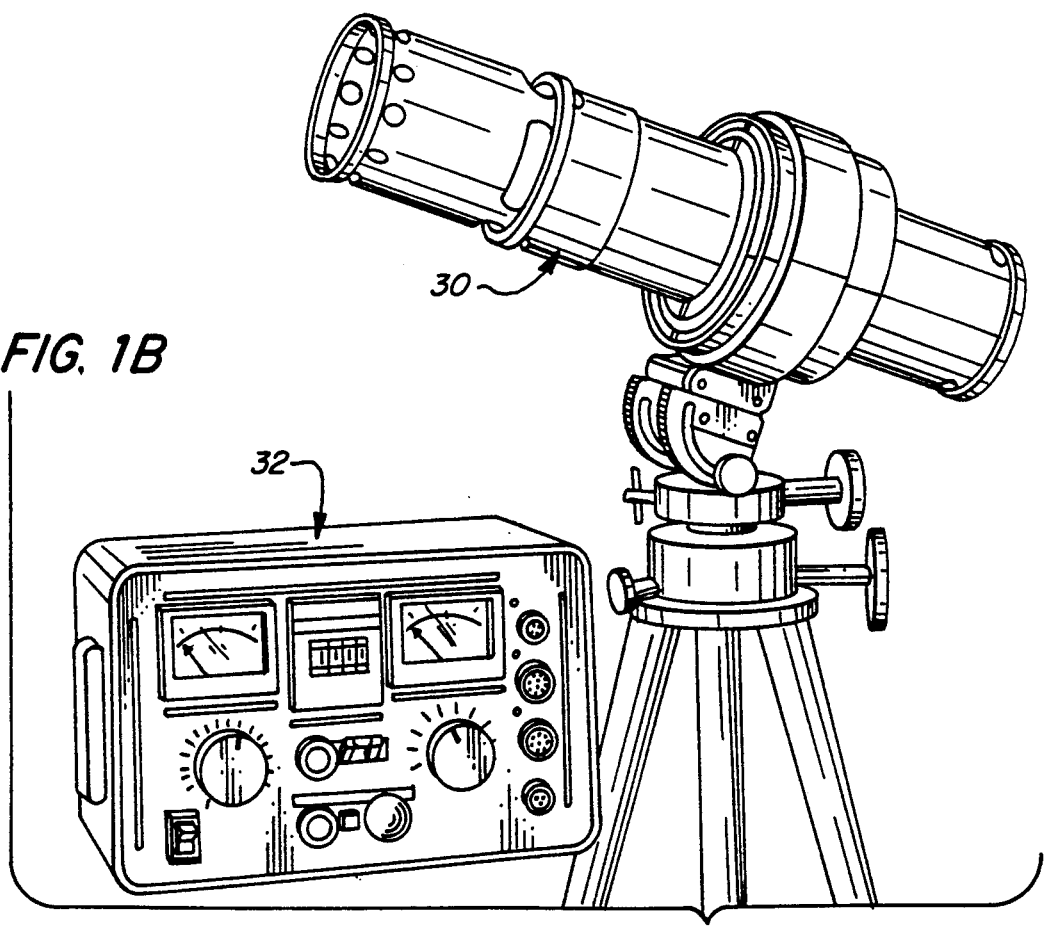
FIG. 1B is a similar perspective view of an air cooled industrial X-ray inspection unit of the present invention with a control unit in the foreground.
Figure 2:
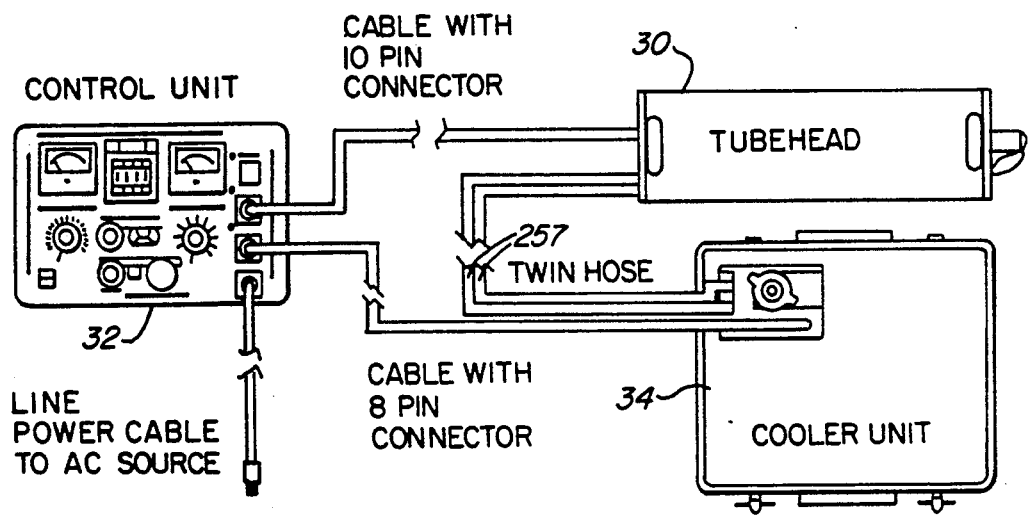
FIG. 2 is a schematic block diagram of the X-ray inspection system shown in FIG. 1A.
Figure 3:
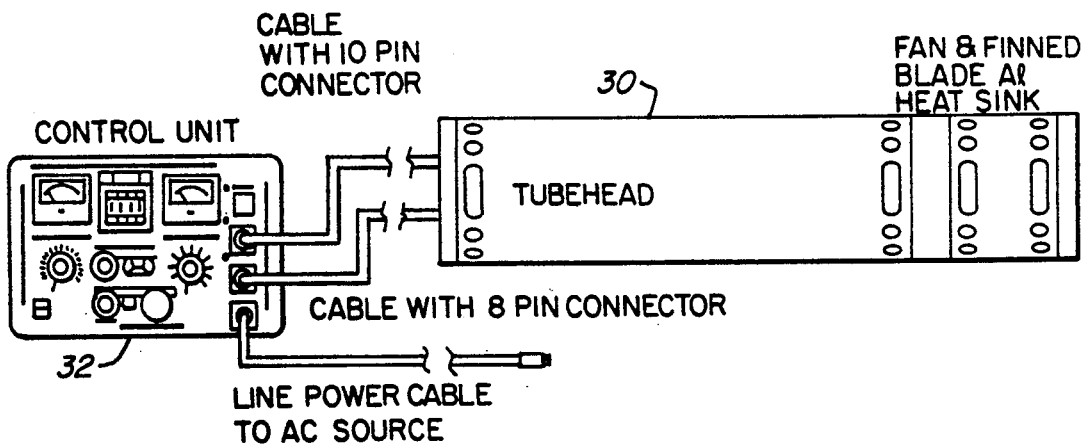
FIG. 3 is a schematic block diagram of the air cooled X-ray inspection unit shown in FIG. 1B with its control unit.
Figure 4:
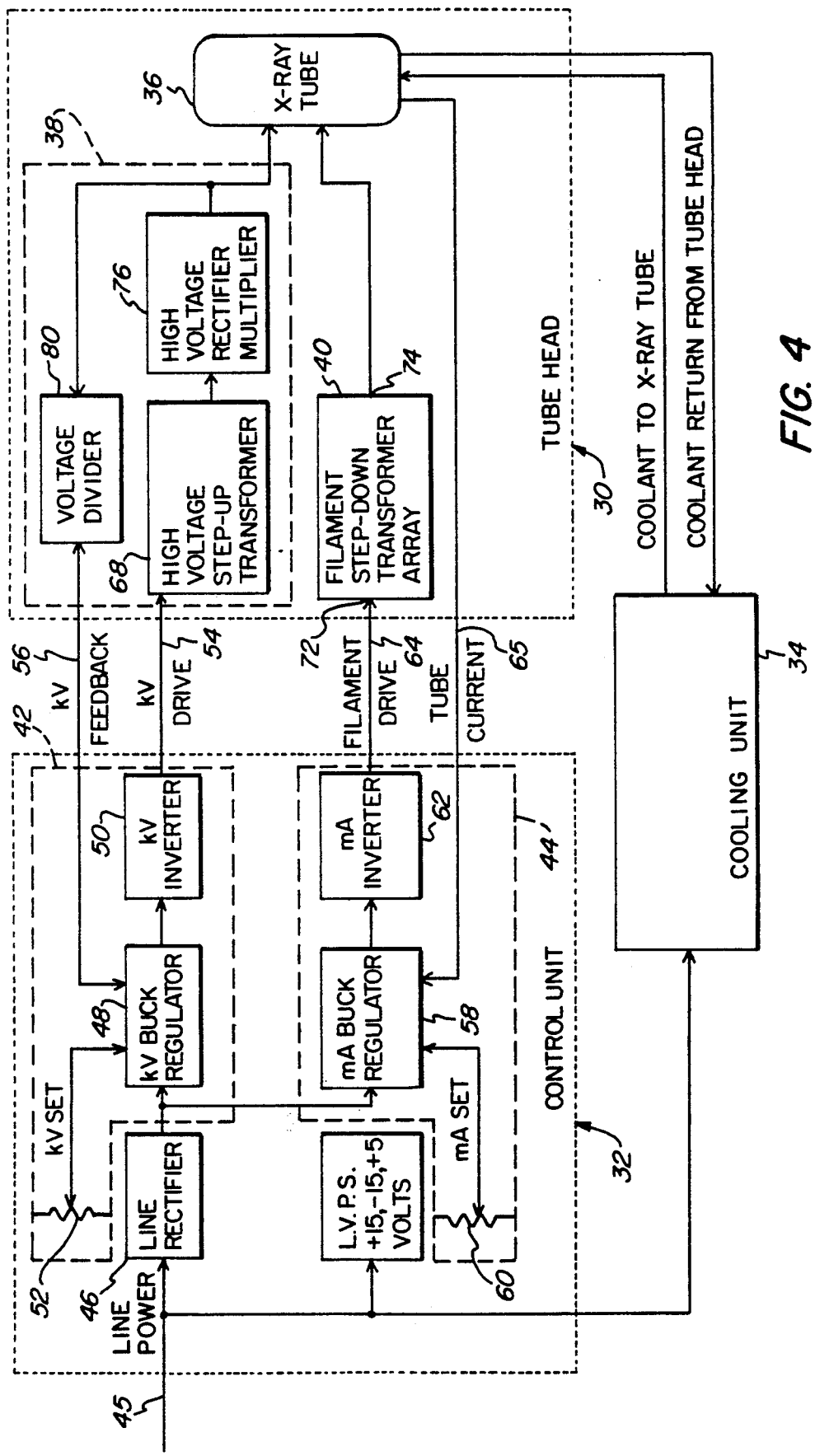
FIG. 4 is a block diagram of the components incorporated in each of the blocks of the block diagram illustrated in FIG. 2.
Figure 8:
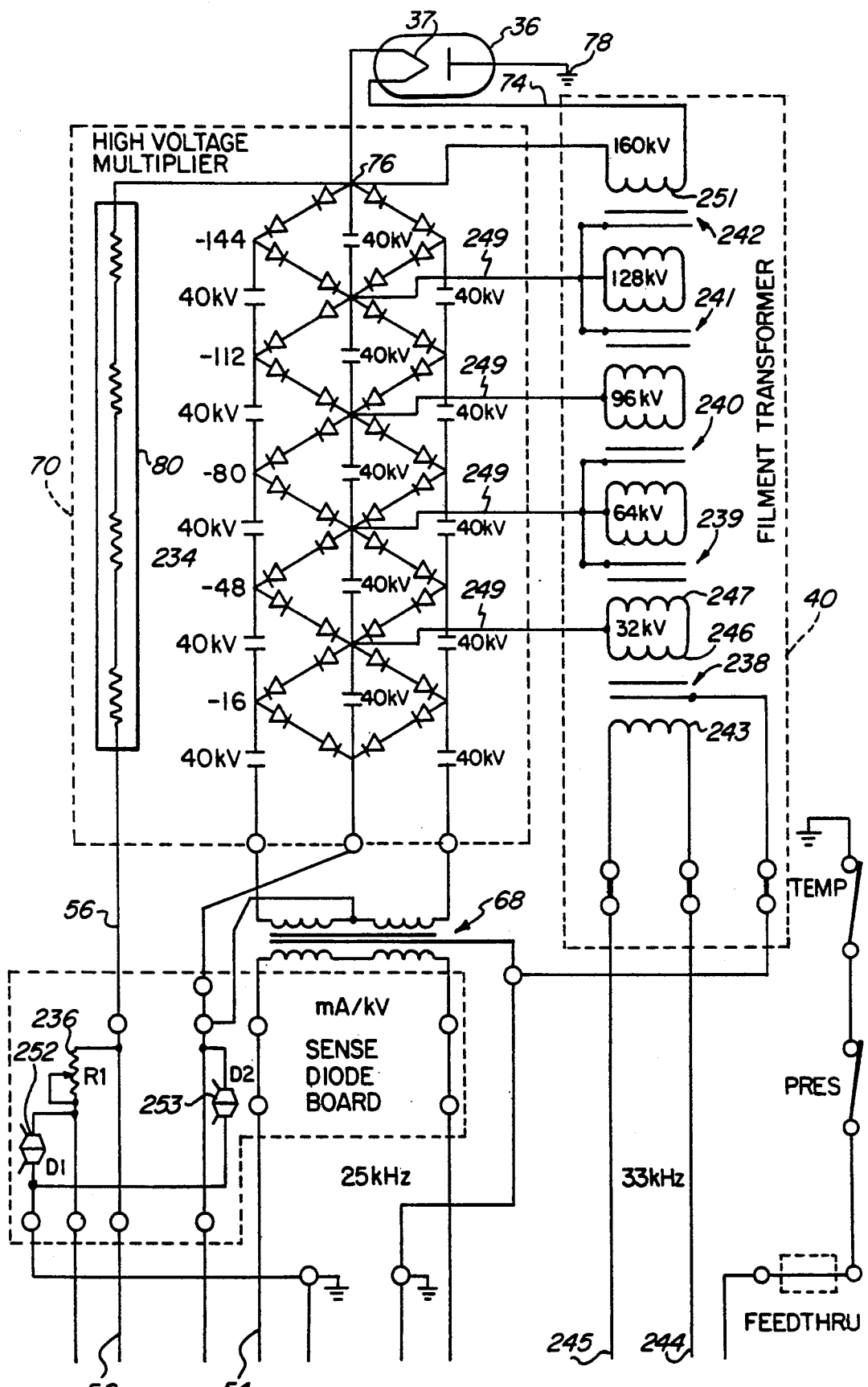
FIG. 8 is a schematic diagram of the tube head circuitry.

Referring to FIG. 4, the portable x-ray unit of the present invention is an analog controlled system comprising three major assemblies: an x-ray tube head 30, a control unit 32, and a recirculating liquid cooling unit 34. The tube head assembly 30 houses an x-ray tube 36, a high voltage DC power supply 38, and a filament transformer 40. The high voltage DC power supply 38 provides the necessary voltage potential needed to generate x-rays within the x-ray tube 36. As seen in FIG. 8, the filament transformer array 40 provides current to the x-ray tube which heats a filament 37 within the tube 36.

The control unit 32 houses circuitry necessary to convert input line power to voltages needed to drive and regulate the high voltage DC power supply 38 and the filament transformer array 40 within the tube head 30.

The cooling unit 34 provides recirculating liquid coolant to the x-ray tube anode (not shown). The cooling system dissipates heat generated at the anode and thus keeps the tube's anode temperature within an acceptable level.

The control unit assembly 32 comprises two principal power sections, the kV drive circuit 42 and the mA drive circuit 44. The kV drive circuit 42 provides power to the high voltage DC power supply circuit 38 within the tube head 30 so that the high voltage DC power supply can develop the high voltage potentials necessary to generate x-rays. The mA drive circuit 44 provides power to the x-ray tube filament 37 for heating the filament so as to emit electrons. The current across the anode and cathode 43 is proportional to the number of electrons emitted by filament 37 and thus is proportional to the temperature of said filament. This filament temperature is in turn controlled by the mA drive 44 circuitry. The mA drive allows control of the number of electrons boiled off by the filament, and thus provides control of the tube current flow.

Electrical line power is supplied to line rectifier 46 which converts 50/60 Hz line power to a regulated D.C. voltage. When the input voltage from a line source is 230 volts, the rectifier 46 provides a D.C. potential output equal to the approximate peak value of the line voltage. When the input voltage from a line source is 115 volts, the rectifier 46 serves as a voltage doubler and the unregulated DC voltage output from the line rectifier is equal to twice the approximate peak value of the line voltage. The unregulated DC power from the rectifier 46 is applied to the kV drive circuitry 42 and the mA drive circuitry 44.

The kV drive circuitry 42 comprises a kV buck regulator 48 and a kV inverter 50. The buck regulator 48 converts the unregulated DC voltage from the rectifier 46 to a regulated DC voltage. The value of the regulated DC voltage is determined by the position of a kV controller potentiometer 52. The regulated DC voltage from the buck regulator 48 is applied to the kV inverter 50 and converted to a square wave voltage for application to the high voltage DC power supply 38 through kV drive conductor 54. A small portion of the kV potential generated in the high voltage DC power supply is sent back to the kV buck regulator 48 by kV feedback conductor 56 so as to allow continual comparison to the setting on kV controller 52. The buck regulator 48 constantly adjusts its regulated output as necessary to maintain the kV level initially set on the kV control 52.

The mA drive supply circuitry 44 within the control unit 32 works similarly to the kV supply circuitry 42. Unregulated DC power from the line rectifier 46 is applied to an mA buck regulator 58 which converts the unregulated DC voltage to a regulated DC voltage. The value of the regulated DC Voltage output from the mA buck regulator 58 is determined by the position of an mA controller 60. The regulated DC voltage is then applied to an mA inverter 62 where it is converted into a square wave AC voltage for application to the filament transformer array 40 by the filament drive conductor 64. The x-ray tube current from the x-ray tube filament is fed back to the mA buck regulator 58 by conductor 65 and is continually compared to the setting on the mA controller 60. The mA buck regulator constantly adjusts its regulated output so as to maintain the tube current initially set on the mA controller 60.

The control unit 32 also houses a plurality of low voltage power supplies 66 which are used to furnish biasing voltages to the internal circuitry within the control unit 32.

The square wave voltage from the kV drive inverter 50 is applied through kV drive conductor 54 to the primary winding of a high voltage step-up transformer 68 within the high voltage DC power supply circuit 38. The step-up transformer 68 increases the amplitude of the AC square wave voltage to approximately 500 volts. The high voltage AC is applied in turn to a high voltage rectifier/multiplier 70. The rectifier/multiplier 70 converts the AC signal to a DC signal and increases the voltage level to 160 kV. The DC voltage is then applied to the x-ray tube's cathode (not shown).

The square voltage wave generated by the mA drive inverter 62 is applied to the input 72 of the filament transformer array 40. The filament transformer 40 array decreases the square wave by approximately nine times to a level appropriate for x-ray tube filaments. Since the x-ray tube filament is at the 160 kV DC potential, the filament transformer 40 is fabricated so as to provide enough isolation to withstand the high voltage differential between its input 72 and its output 74.

The tube head 30 is pressurized to approximately 50 psi with sulfur hexafluoride gas so as to provide insulation for the high voltage potential therein.

Figure 5A:
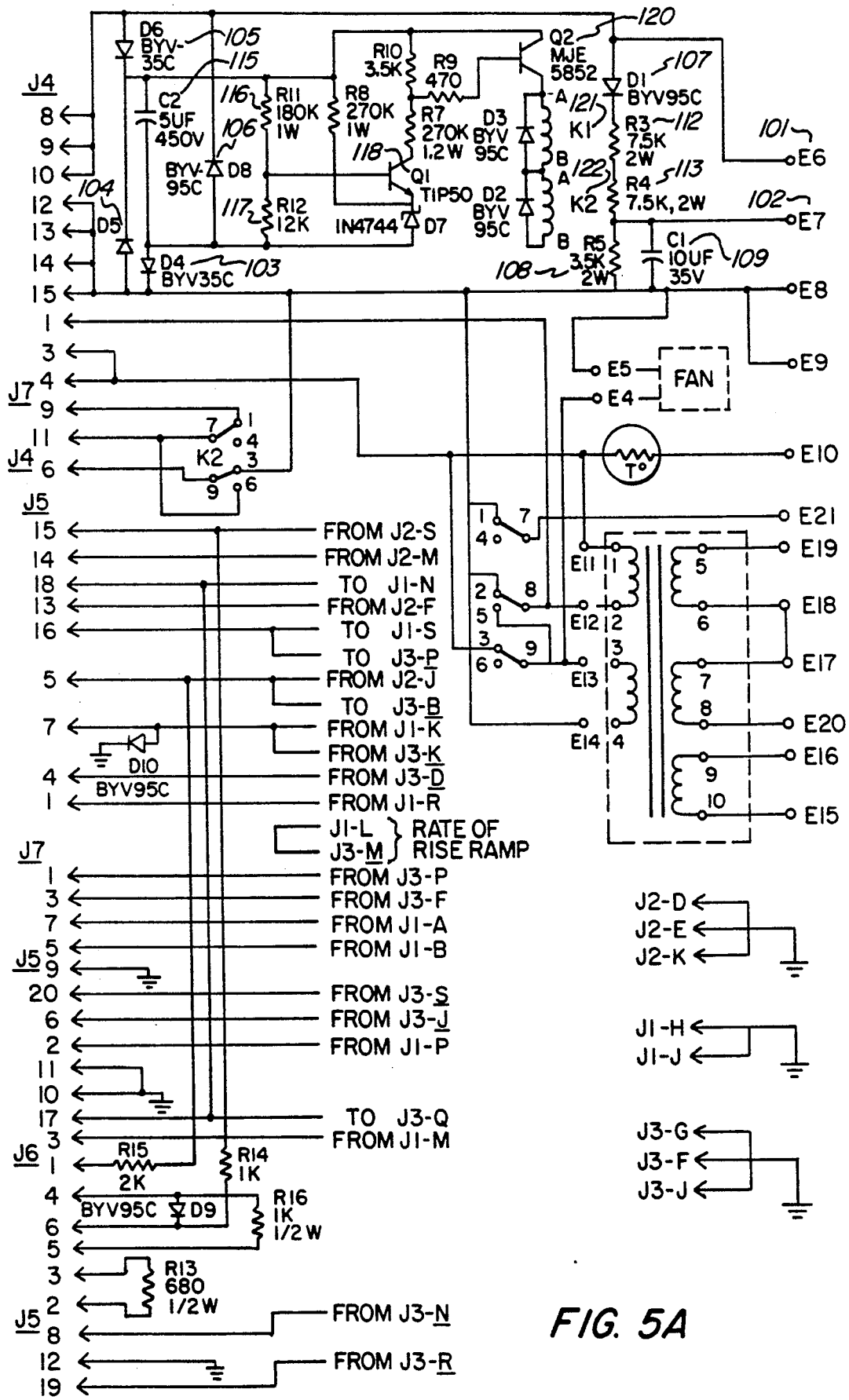
FIGS. 5A and 5B are schematic diagrams of the automatic line voltage configuration circuit.
Figure 5B:
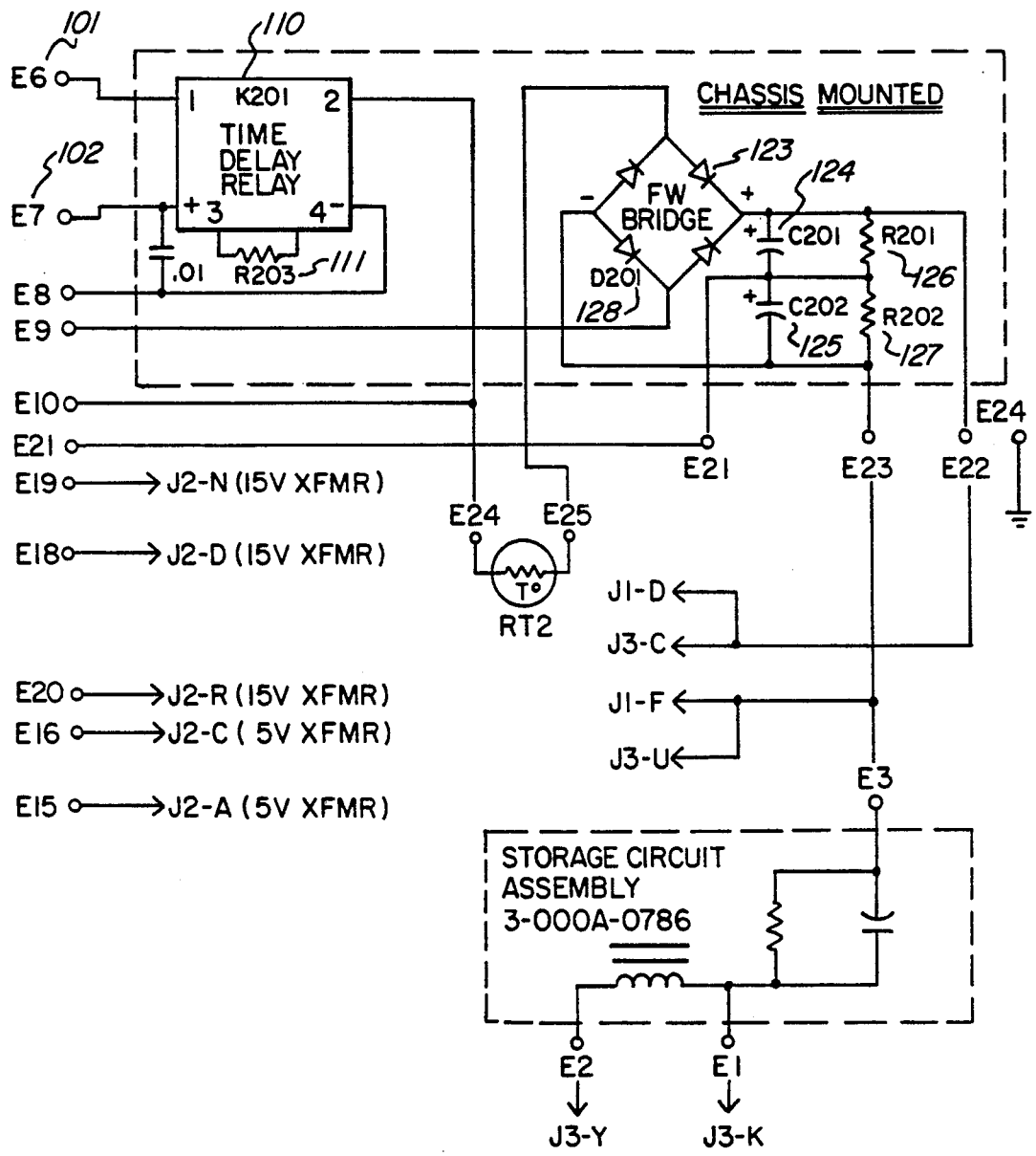

An automatic line voltage configuration circuit within the line rectifier 46 is shown in FIG. 5. Referring to FIGS. 4 and 5, the automatic line voltage configuration circuit samples the supplied line voltage from line source input 45 to determine whether the input voltage is between 100 and 135 volts or between 200 to 250 volts. The sampling of the input voltage allows the configuration of appropriate circuitry within the control unit to operate from the applied line voltage.

When a circuit breaker (not shown) on the control unit is switched to "on", line voltage is applied to terminals 101 and 102. From terminals 101 and 102, the input voltage advances through diodes 103, 104, 105, 106 and 107, resistor 108, capacitor 109 and time delay relay 110. The time delay relay 110 prevents line voltage from being applied to the rest of the control unit's circuitry for approximately 2 seconds after the control unit is switched on. The length of the delay is determined by the value of resistor 111.

Diode 107 and resistors 112, 113, 114 invert line voltage to direct current at a level sufficient to cause the time delay relay 110 to start its timing interval. Diodes 103, 104, 105 and 106 collectively create a full wave rectifier and with capacitor 115, the combination converts line voltage to a DC voltage equal to the approximate peak value of the line source AC voltage. The converted DC voltage is divided by resistor 116 and 117 and is compared by transistor 118 to a reference voltage set by diode 119.

If the incoming line voltage is less than a set reference voltage (100-135 volts), additional circuit configuration is not required and the control unit remains configured for this lower line voltage and the time delay relay 110 "times out" thereby applying line voltage to the rest of the control unit circuitry. If the input line voltage is between the range of 200 to 250 volts, the compared voltage is greater than the set reference voltage. Transistor 118 switches causing transistor 120 to pull relays 121 and 122. Relays 121 and 122 configure the cooling unit 34, a low voltage power supply transformer 128 and a main rectifier doubler comprised of FW bridge 123, capacitors 124, 125 and resistors 126 and 127, to operate from the higher line voltage.

Similar to the low voltage configuration, when the time delay relay 110 "times out", line voltage is applied to the remaining circuits within the control unit. When relay 121 is not energized (line voltage is between 100-135 volts), the circuit operates as a half wave voltage doubler. On the positive half of the line voltage cycle, capacitor 124 changes to the peak of the line voltage input. On the negative half of the line voltage cycle, capacitor 125 changes to the peak of the line voltage. The resultant sum voltage across capacitors 124 and 125 is twice the peak of the line voltage input. When relay 121 is energized (line voltage is between 200 and 250 volts), diode 129 performs as a full wave bridge, charging capacitors 124 and 125 in series. The resulting DC voltage developed across capacitors 124 and 125 is fed to the kV drive circuitry 42 and the mA drive supply circuitry 44.

Figure 6A:
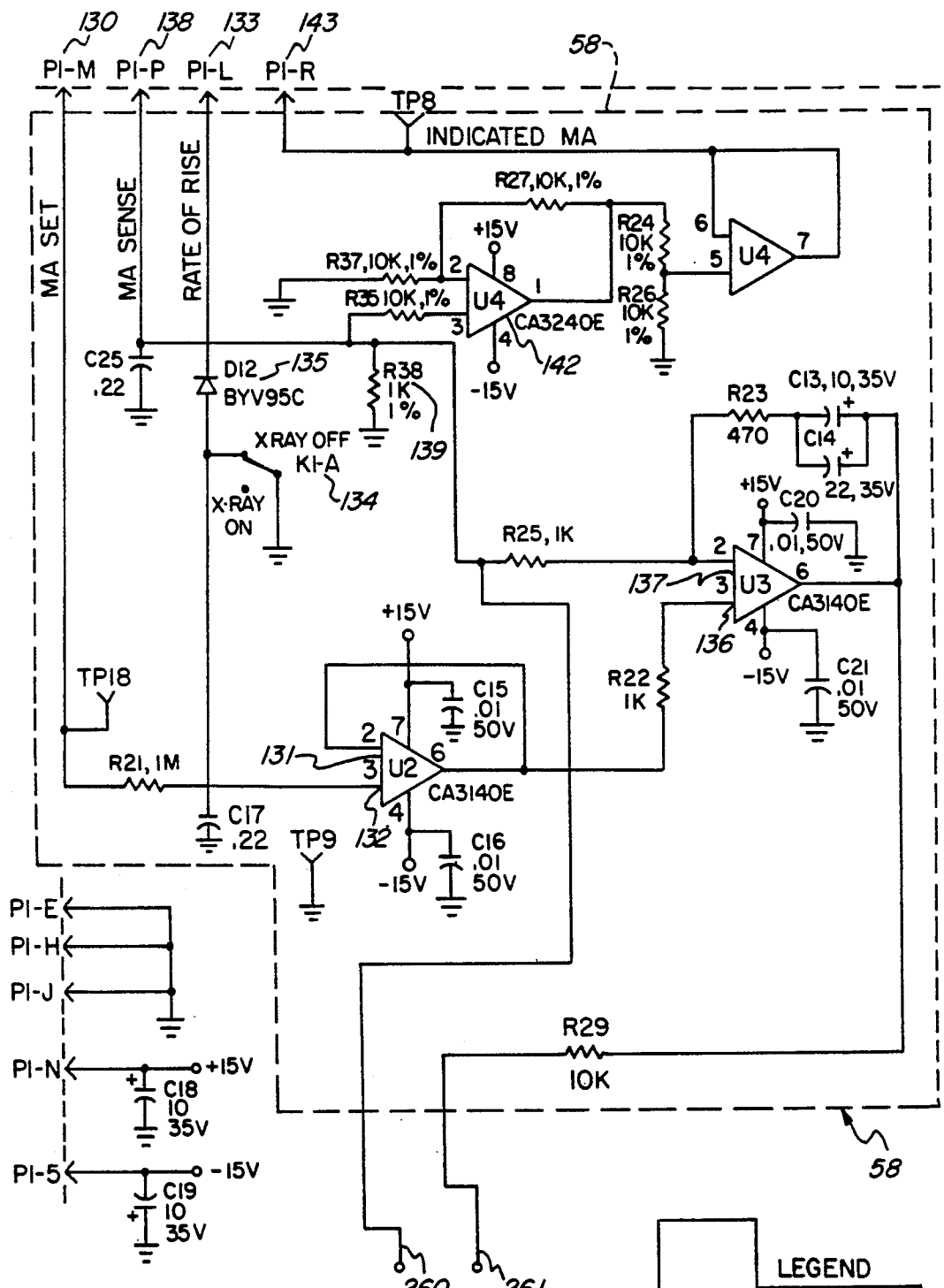
FIG. 6A is a schematic diagram of the first portion of the mA drive circuitry.
Figure 6B:
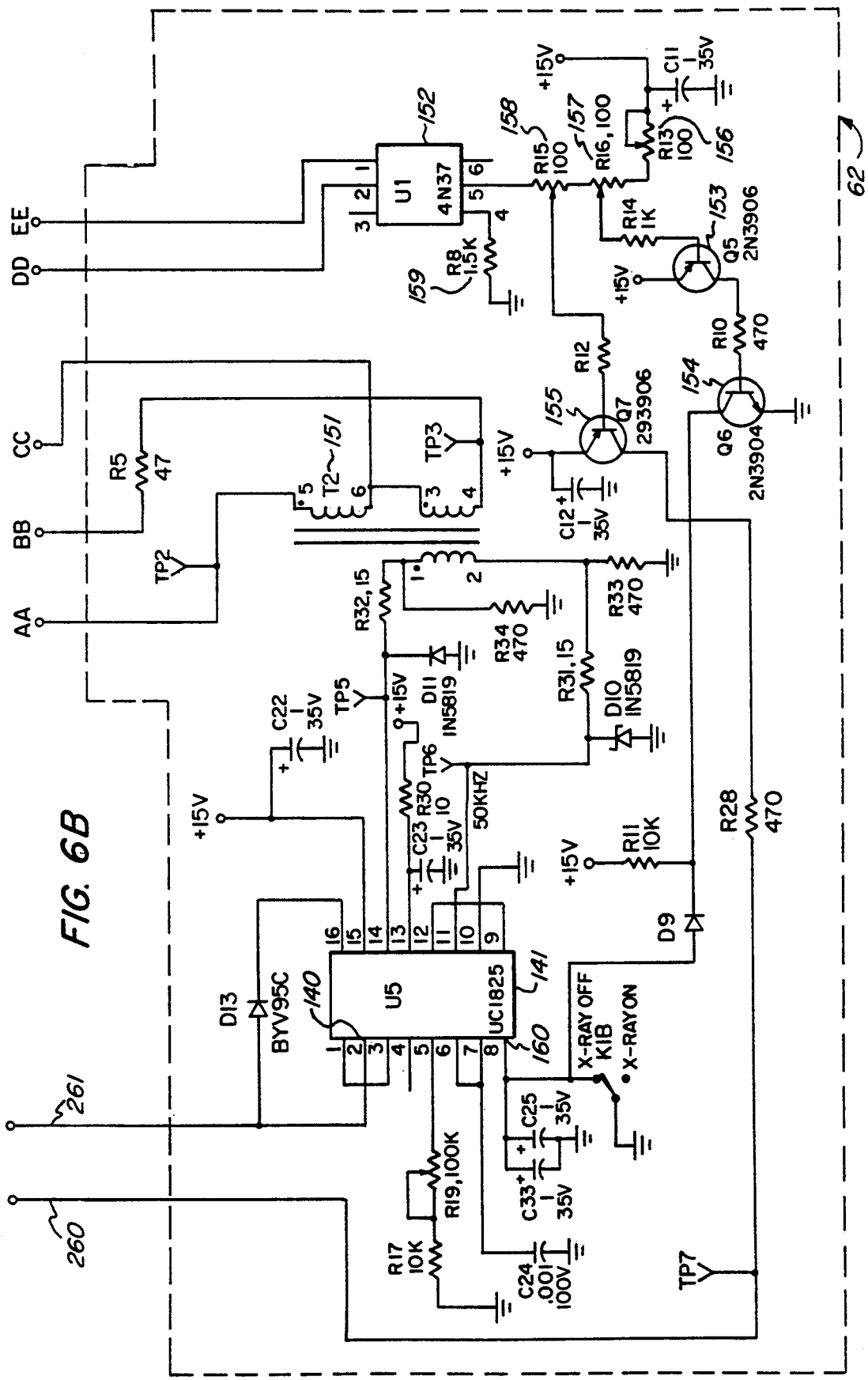
FIGS. 6B and 6C are schematic diagrams of the second portion of the mA drive circuitry.
Figure 6C:
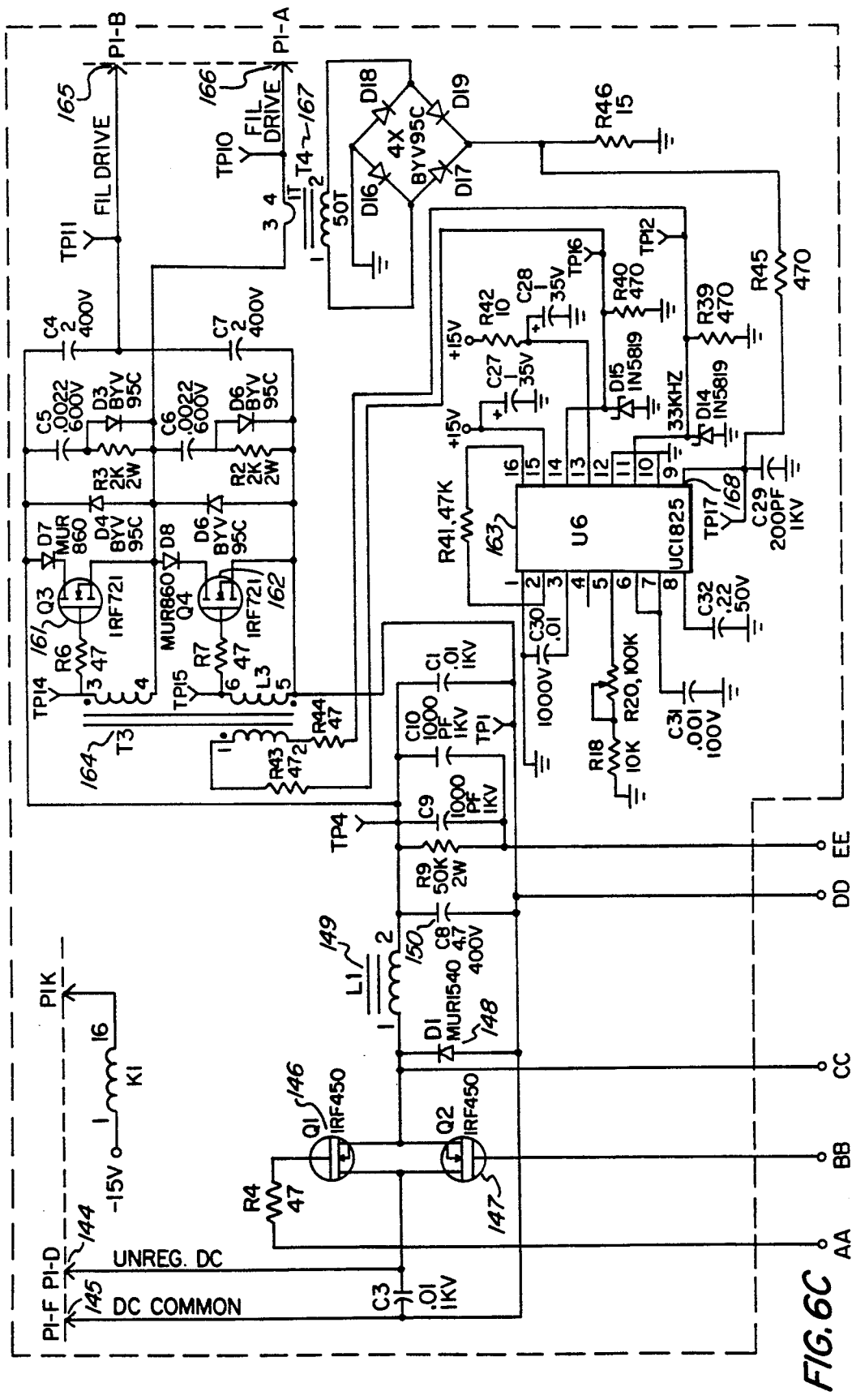

FIGS. 6A and 6B show the mA drive circuitry 44 including the buck regulator 58 and the inverter 62. Referring to FIGS. 4, 5, 6A, and 6B the mA drive circuitry converts rectified and filtered line voltage to a 33 kHz square wave that is used to drive the tube head filament transformer array 40.

A 0 to +5 volt DC control voltage from mA controller 60 enters the circuit at terminal 130. The control voltage is then applied to buffer 131. A rate-of-rise ramp voltage is generated by the kV drive circuitry 42 and fed to the buffer 131 at input 132 by terminal 133. When an "x-ray on" switch (not shown) is depressed, switch 134 is energized, removing the ground from input 132 of buffer 131. The ramp voltage from the kV supply circuitry 42, simultaneously starts from zero, and slowly ramps up toward +15 volts. If the ramp voltage is less than the control voltage, buffer 131 sees the ramp voltage. Once the ramp voltage becomes greater than the control voltage, diode 135 is reverse biased, and buffer 131 sees only the control voltage. The output of the buffer 131 is fed to the noninverting input 136 of error amplifier 137.

X-ray tube current enters the mA drive circuitry 44 at terminal 138. The current entering the circuitry has a range of 0 to 5 ma. The entering current generates a 0 to 5 voltage analog potential across resistor 139. This corresponding voltage is applied to the inverting input 136 of error amplifier 137. The difference between the tube current voltage analog and the mA set control voltage is amplified by error amplifier 137 and fed along conductor 261 to pin 140 of pulse width modulator 141. The tube current analog is buffered by buffer 142 and connected to terminal 143.

Unregulated DC voltage from the main power rectifier/doubler enters the mA supply circuitry 42 at terminal 144 and terminal 145, and is applied to a buck switching rectifier comprised of transistors 146 and 147, diode 148, inductor 149, and capacitor 150. Pulse width modulator 141 provides pulses to transformer 151. The width of the pulse is proportional to the error voltage from error amplifier 137. The duty cycle control pulses from the secondary windings of transformer 151 are 180° out of phase, which causes transistors 146 and 147 to turn on alternately. The pulses of current from transistors 146 and 147 are smoothed by inductor 149, diode 148 and capacitor 150, thus providing a smooth DC voltage across capacitor 150. The amplitude of capacitor 150 is required to maintain x-ray tube current at a desired preset level.

Integrated circuit 152, transistors 153, 154, 155 and associated components comprise a voltage sensing/voltage limiting circuit. This circuit prevents excessive voltage (voltage that may damage the x-ray tube filament) from being developed across capacitor 150 when feedback current is not present. When the voltage across capacitor 150 reaches a predetermined level, enough current flows through the photo diode in integrated circuit 152, causing current to flow through resistors 156, 157, 158 and 159. Resistor 158 is normally set so that transistor 155 is switched on when the voltage at capacitor 150 reaches approximately 145 volts. When transistor 155 turns on, current flows along conductor 260 and through resistor 139 causing the buck regulator 58 to regulate at 145 volt level. Transistors 153 and 154 are set using resistor 157 to turn on when the voltage at capacitor 150 reaches approximately 150 volts. When transistors 153 and 154 are turned on, they reduce the voltage on pin 160 of pulse width modulator 141, limiting its duty cycle, and preventing the voltage on capacitor 150 from going higher. This secondary voltage limiting circuit prevents high tube current when feed control is coming into regulation.

The DC voltage developed at capacitor 150 is fed to a half wave inverter comprised of transistors 161 and 162. Integrated circuit 163 acts as an oscillator outputting a 33 kHz square wave to the primary winding of transformer 164. The frequency of 33 kHz is chosen so as to avoid interference with the kV drive frequency of 25 kHz and is also found to be an efficient frequency for driving the filament transformer array with the mA drive circuitry and is less likely to saturate the core of transformer 164 than at lower frequencies such as 25 kHz. Although 33 kHz is preferred, other high frequencies may be also be used for driving the filament transformer array. The secondary windings of transformer 164 are phased 180° apart to alternatively turn on transistors 161 and 162. A square wave is thus developed between terminals 165 and 166. Transformer 167 senses the current out of the inverter. A voltage is developed at pin 168 which is the pulse by pulse current limit input of integrated circuit 163. This voltage is proportional to the current in the primary winding of transformer 167. When enough voltage (approximately 1 volt) is developed at pin 168 to reach the current limit threshold, the pulse from integrated circuit 163 thus, is terminated limiting the current.

Figure 7A:
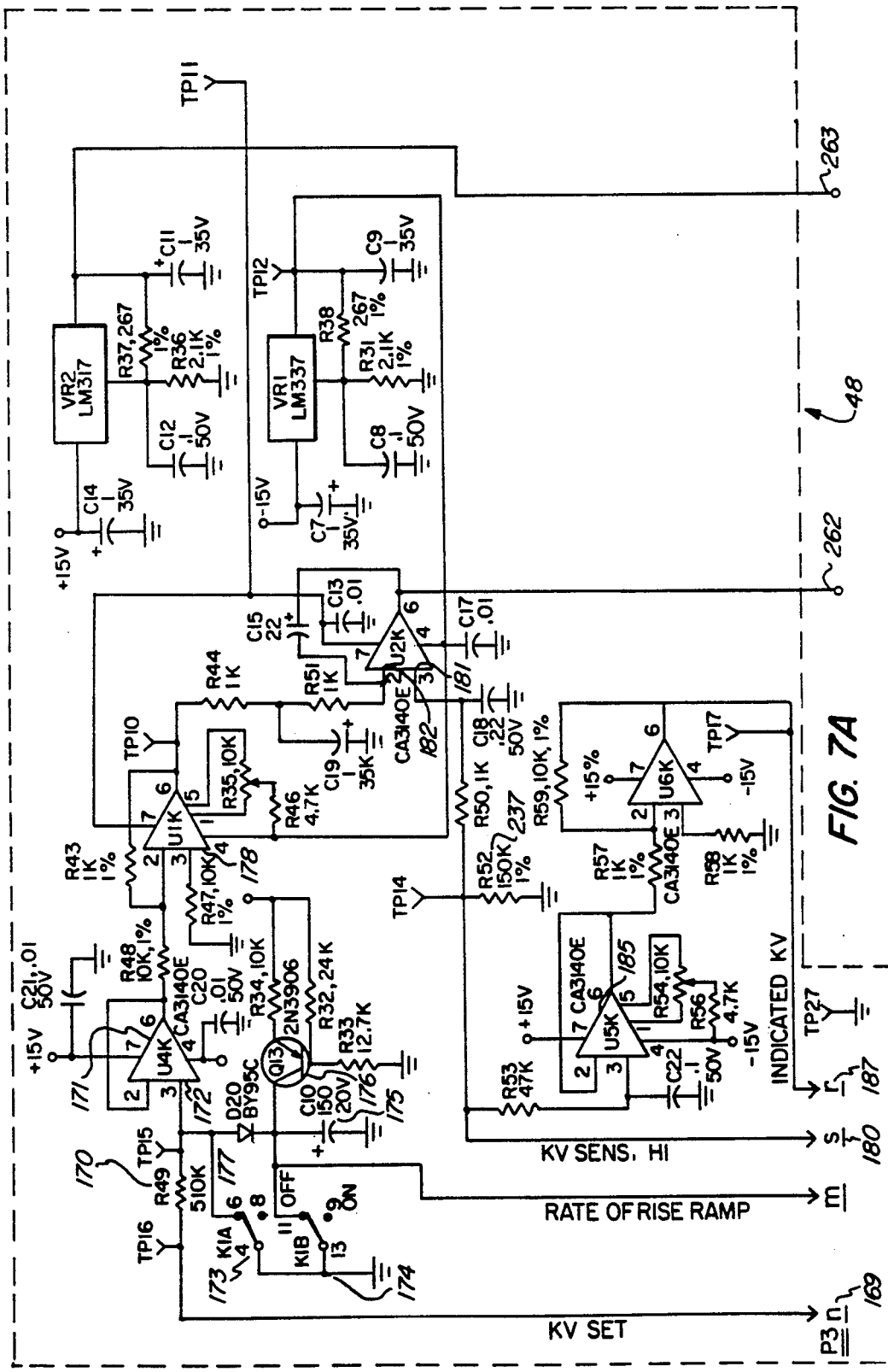
FIG. 7A is a schematic diagram of the first portion of the kV drive circuitry.
Figure 7B:
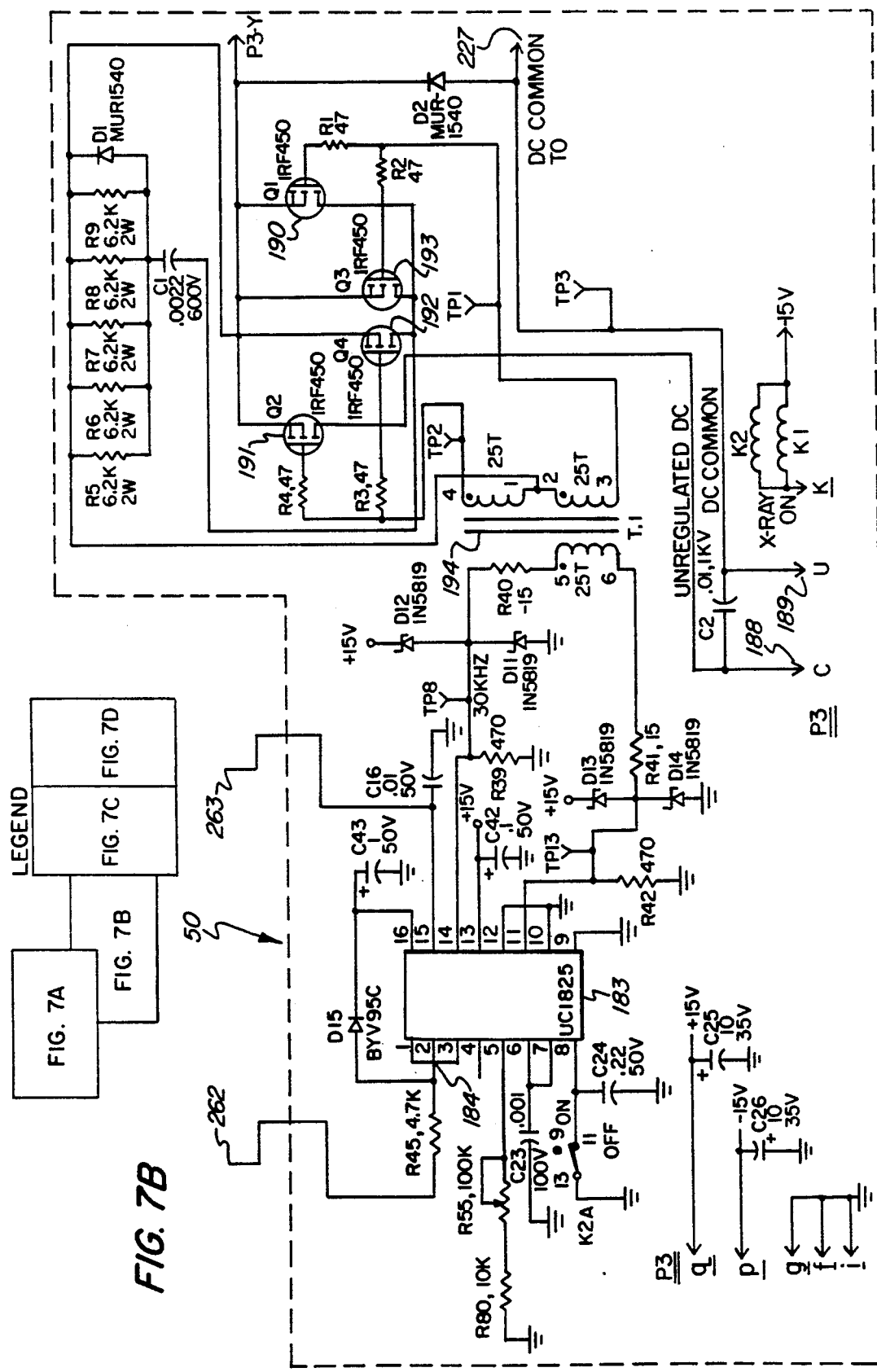
FIG. 7B is a schematic diagram of the second portion of the kV drive circuitry.
Figure 7C:
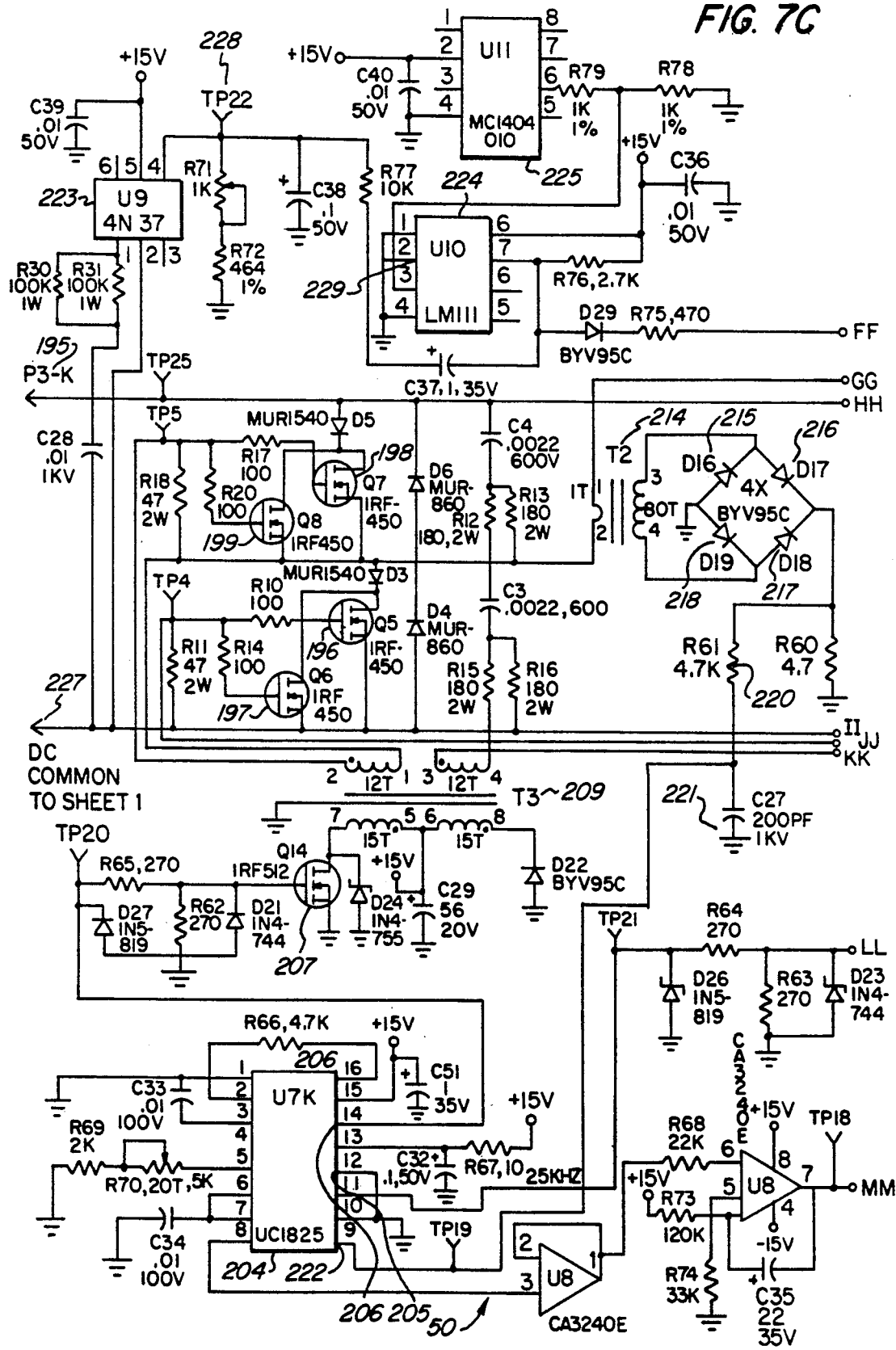
FIGS. 7C and 7D are schematic diagrams of the third portion of the kV drive circuitry.
Figure 7D:
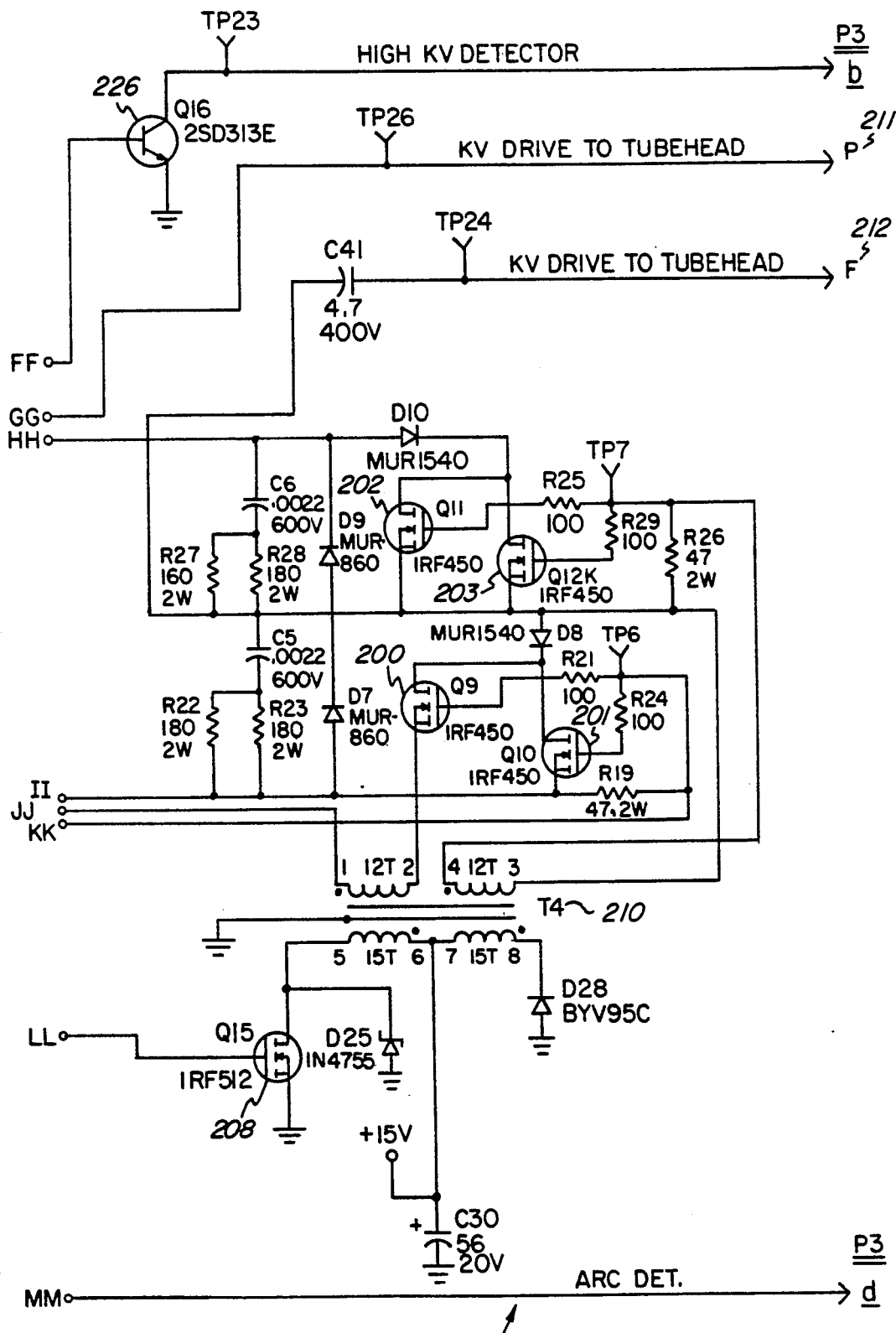

FIGS. 7A, 7B and 7C show kV drive supply circuitry 42 which converts rectified filtered line voltage into a 25 kHz square wave so as to drive the high voltage transformer 68 in the tube head. Referring to FIGS. 4, 5, 6A, 6B, 7A, 7B and 7C, a 0 to +10 volt DC control voltage is applied to the kV drive supply circuitry at terminal 169. Terminal 169 is in turn connected through resistor 170 to buffer 171 at pin 172. When x-ray generation is off, pin 172 is held at electrical ground by relay 174. Relay 174 keeps capacitor 175 discharged. When x-ray generation is activated, relays 173 and 174 pull in and the electrical grounds are removed. Capacitor 175 is charged linearly by constant current source transistor 176. Since initially the voltage on capacitor 175 is lower than the voltage at terminal 169, diode 177 is forward biased keeping the voltage at pin 172 close to that of capacitor 175. When the voltage on capacitor 175 rises to that on terminal 169, the diode 177 becomes reversed biased, and capacitor 175 no longer influences buffer 171. The voltage at capacitor 175 continues to rise to approximately +15 volts. The 0 to +10 control voltage on terminal 169 alone is then buffered by buffer 171.

The buffer control voltage from buffer 171 is divided by 10 and reversed in polarity at inverter 178 and is then applied to input 182 of error amplifier 179. A 0 to −1 volt sense voltage from the tube head proportional to 0 to 160 kV, enters the circuit at terminal 180. This sense voltage is applied to input 181 of the error amplifier 179. The difference between the control voltage input 182 and the sense voltage input 181 is amplified with high gain by error amplifier 179. The amplified difference voltage is applied along conductor 262 to pulse width modulator 183 at pin combination 184. The higher this voltage is, the greater the duty cycle of pulse width modulator 183. The sense voltage is also buffered by buffer 185. This buffered voltage is multiplied by 10, and inverted in polarity in inverter 186, thus providing a 0 to +10 analog voltage proportional to 0 to 160 kV at terminal 187. The unregulated DC from the main rectifier/doubler enters the circuit at terminals 188 and 189 and is applied to switching transistors 190, 191, 192, and 193. The output pulses from pulse width modulator 183 are coupled to the transistor switches 190–193 through transistors 191 and 193 turn on 180° out of phase with transistors 190 and 192. The current pulses from the transistor switches are routed to a storage inductor assembly. Regulated, filtered DC, whose amplitude is a function of kV control 52, is provided at the output of the storage inductor assembly and enters the kV drive circuit at terminal 195.

Transistors 196 through 203 form a full wave inverter. Integrated circuit 204 serves as an oscillator providing two 25 kHz square wave outputs at pins 205 and 206. The two 25 kHz square wave outputs are 180° out of phase. These outputs are provided to transistors 207 and 208 and cause the transistors to switch on at a 25 kHz rate 180° out of phase. These pulses are coupled through transformers 209 and 210 to transistors 196 through 203. Parallel transistor pair 198 and 199, and parallel transistor pair 200 and 201, turn on together while pair 196 and 197 and parallel pair 202 and 203 are off. This causes terminal 211 to be more positive than terminal 212 by an amount nearly equal to the regulated voltage at terminal 195. On the other half of the 25 kHz cycle, transistors 198, 199, 200 and 201 are off, while transistors 196, 197, 202 and 203 are on. At this time terminal 212 is more positive than terminal 211 by the amount of the regulated voltage. This developed square wave is transmitted to the tube head step up transformer 68 via conductor 54. The transformer bridged diodes 215 through 218, and resistors 219 and 220 form a current sense/limit circuit. The current pulses provided to the tube head at step up transformer 68 cause a pulsing voltage to be developed in the secondary winding of transformer 68. This pulsing voltage is rectified by the diode bridge (215–218) and slightly filtered by resistor 220 and capacitor 221. This slightly smoothed pulsing DC is fed to pin 222 the pulse by pulse current limiting input of IC 204. If a pulse of voltage exceeds approximately one volt, the output pulse of IC 204 is terminated and the inverter output current is limited.

Photo coupler integrated circuit 223, comparator 224, buffer 225, and transistor 226, form a circuit which turns off x-ray generation if the regulated voltage provided to the kV inverter 50 exceeds a preset level. The voltage between terminal 195 and D.C. common 227 causes a current flow through photo coupler 223 whose amplitude is proportional to voltage. The voltage developed at terminal 228 is proportional to the voltage at 195. The voltage at terminal 228 is fed to one side of comparator 224 at pin 229. A fixed stable reference voltage from buffer 225 is fed to the other input of comparator 224. When the voltage at terminal 228 exceeds the reference voltage, the comparator 224 output at pin 230 switches to its alternate state, causing transistor 226 to turn on. Transistor 226 causes an "x-ray on" relay (not shown) to unlatch, terminating x-ray generation until it is again manually activated. Resistor 231 is normally set to shut down x-ray production when the voltage between terminal 195 and the D.C. common 227 reaches approximately 255 volts.

FIG. 8 shows a schematic diagram of the tube head circuitry. Referring to FIGS. 4, 5, 6, 7a, 7b, and 8 the tube head circuitry converts the square wave drive signal from the control units kV drive supply circuitry 42 into a −160 kV maximum bias for the cathode of the x-ray tube. The circuitry also steps down the square wave filament and drive signal from the control unit's mA drive supply circuitry 44 to approximately a 4 volt, 4 amps signal required to drive the x-ray tube filament. The kV drive signal enters the tube head at terminal 232 and terminal 233. Terminals 232 and 233 are connected to the primary of the high voltage step-up transformer 68. The transformer 68 steps up the drive signal from 450 volts peak-to-peak to approximately 32 kV at the secondary. The secondary is connected to a serial five stage full wave diode-capacitor multiplier-rectifier which converts the 32 kV AC transformer output to −160 kV at cathode junction 76. A −32 kV increase is added at each of the multiplier DC leg. The −160 kV DC cathode junction 76 is connected to the x-ray tube cathode. The x-ray tube anode is connected to ground 78. A series combination of four 3,000 MΩ resistors 80 are connected to the tube cathode at one end. The series of resistors 80, along with the parallel combination of resistor 236 and resistor 237 (FIG. 7a) on the kV circuit form a 160,000 to 1 voltage divider. The voltage divider furnishes a feedback voltage at conductor 56 which is input to the control unit kV drive circuitry.

Filament transformer array 40 comprises five stages 238, 239, 240, 241, and 242, each stage comprising a primary and secondary winding. Primary winding 243 of stage 238 is connected to terminals 244 and 245 which are in turn connected to the 33 kHz output of the control unit mA drive circuitry 44. The secondary winding 246 of stage 238 is connected to primary winding 247 of the adjacent succeeding stage 239. Likewise each primary winding of a stage is connected to a secondary winding of a preceding stage. Also, each interconnected secondary-primary winding (e.g. secondary winding 246, and primary winding 247) is in turn interconnected to a corresponding multiplier-rectifier stage via line 249 so as to match the D.C. potential of these windings to the DC potential of the corresponding stage of the D.C. multiplier-rectifier circuit 234. Thus, by utilizing five stages in the filament transformer and interconnecting the windings to the multiplier-rectifier stages, the maximum voltage between the primary of one stage and the secondary winding of the adjacent succeeding stage is limited to 32 kV. This voltage limitation allows the use of smaller dielectric volume and weight of insulation between inductively coupled transformer stage windings. Thus, the five stages of the filament transformer array 40 provide at secondary winding 251 a 4 volts, 4 amp, 33 kHz output signal to the filament so as to allow sufficient warming of the filament to emit electrons. This output signal is at a DC potential of −160 kV. Diode 252 and 253 limit the voltage on the feedback lines in the event of a malfunction.

Thus, what has been described is a circuit for producing X-ray radiation in a portable light weight X-ray unit.

What is claimed is:

1. A power supply circuit for producing excitation voltage for an X-ray tube filament so as to produce X-ray radiation therefrom, said circuit comprising:
   a step-up voltage transformer having a primary winding and a secondary winding, wherein the primary winding is connected to a source of time varying voltage;
   a plurality of serially-connected voltage multiplying-rectifying stages having a low voltage potential end and a high voltage potential end, wherein the low voltage potential end is connected to the secondary winding of said step-up voltage transformer;
   N filament transformer stages, where the number N is equal to or less than the number of stages in the plurality of serially-connected voltage multiplying-rectifying stages, each stage having a primary winding, a secondary winding and a conductor connected to one end of the secondary winding, a first stage having a primary winding connected to a source of time varying voltage, the second winding of the first stage connected to the primary winding of the second stage and connected by one of said conductors to one of said plurality of serially-connected voltage multiplying-rectifying stages, each transformer stage less than the Nth and greater than the first having one of the conductors connected to a successively higher voltage multiplying-rectifying stage and the Nth stage having one of the conductors connected to the high voltage end of said serially connected voltage rectifying stages; and
   an X-ray tube filament having a first terminal and a second terminal, wherein said first terminal is electrically connected to the high voltage end of said plurality of serially connected voltage remultiplying rectifying stages and the second terminal is connected to the secondary winding of the Nth transformer stage.

2. The power supply circuit of claim 1, further comprising:
   a voltage dividing circuit having a high voltage potential end and a low voltage potential end, wherein the high voltage potential end of said circuit is electrically connected to the high voltage end of said plurality of serially-connected voltage multiplying-rectifying stages and whereby said circuit provides a low voltage analog of the high voltage developed at the high voltage potential end of said plurality of serially-connected voltage multiplying-rectifying stages.

3. The power supply circuit of claim 2, further comprising:
   a line source rectifier providing a single preset rectified voltage output from at least two preset voltage ranges of time varying voltage;
   a buck regulator having an input electrically connected to the output of said line source rectifier and another input electrically connected to the low voltage potential end of said voltage dividing circuit, wherein said regulator provides a regulated voltage output, and wherein said regulator includes a means for setting said regulated voltage output; and
   an inverter having an input electrically connected to the output of said buck regulator, wherein said inverter provides the time varying voltage to said step-up transformer.

4. The power supply circuit of claim 1, further comprising:
   a line source rectifier providing a single preset rectified voltage output from at least two preset voltage ranges of time varying voltage;
   means defining a tube current path;
   a buck regulator having a first input electrically connected to the output of said line source rectifier, a second input electrically connected to the tube current path, and a third input electrically connected to a means for setting a regulated voltage output, whereby said regulator provides a regulated voltage output responsive to the first, second, and third inputs; and
   an inverter having an input electrically connected to the output of said buck regulator, wherein said inverter provides the time varying voltage to the primary winding of the first transformer of the N filament transformers.

5. A power supply circuit for producing excitation voltage for an X-ray tube filament so as to produce X-ray radiation therefrom, said circuit comprising:
   a step-up voltage transformer having a primary winding and a secondary winding, wherein the primary winding is connected to a source of time varying voltage;

a plurality of serially-connected voltage multiplying-rectifying stages having a low voltage potential end and a high voltage potential end, wherein the low voltage potential end is connected to the secondary winding of said step-up voltage transformer;

N filament transformer stages, where the number N is equal to or less than the number of stages in the plurality of serially-connected voltage multiplying-rectifying stages, each stage having a primary winding, a secondary winding and a conductor connected to one end of the secondary winding, a first stage having a primary winding connected to a source of time varying voltage, the second winding of the first stage connected to the primary winding of the second stage and connected by one of said conductors to one of said plurality of serially-connected voltage multiplying-rectifying stages, each transformer stage less than the Nth and greater than the first having one of the conductors connected to a successively higher voltage multiplying-rectifying stage and the Nth stage having one of the conductors connected to the high voltage end of said serially connected voltage rectifying stages; and an X-ray tube filament having a first terminal and a second terminal, wherein said first terminal is electrically connected to the high voltage end of said plurality of serially connected voltage remultiplying rectifying stages and the second terminal is connected to the secondary winding of the Nth transformer stage;

a voltage dividing circuit having a high voltage potential end and low voltage potential end, wherein the high voltage potential end of said circuit is electrically connected to the high voltage potential end of said plurality of serially-connected voltage multiplying-rectifying stages and whereby said circuit provides a low voltage analog of the high voltage developed at the high voltage potential end of said plurality of serially-connected voltage multiplying-rectifying stages;

a line source rectifier providing a single preset rectified voltage output from at least two preset voltage ranges of time varying voltage from a line source;

a first buck regulator having an input electrically connected to the output of said line source rectifier, and another input electrically connected to the low voltage end of said voltage dividing circuit, wherein said regulator provides a regulated voltage output, and wherein said regulator includes a means for setting said regulated voltage output;

a first inverter having an input electrically connected to the output of said first buck regulator, wherein said inverter provides the time varying voltage to said step-up transformer;

means defining a tube current path;

a second buck regulator having a first input electrically connected to the output of said line source rectifier, a second input electrically connected to the tube current path, and a third input electrically connected to a means for setting a regulated voltage output, whereby said regulator provides a regulated voltage output responsive to the first, second, and third inputs; and a second inverter having an input electrically connected to the output of said second buck regulator, wherein said inverter provides the line varying voltage to the primary winding of the final transformer of said plurality of filament transformers.

6. The power supply circuit of claim 5, wherein the frequency of the time varying voltage output of the first inverter is different from the frequency of the time varying voltage output of the second inverter.

7. The power supply circuit of claim 5, wherein the frequency of the time varying voltage output of the first inverter is in the approximate range of 22 to 28 kHz and the frequency of the time varying voltage output of the second inverter is in the approximately range of 30 to 36 kHz.

8. The power supply circuit of claim 5, wherein the frequency of the time varying voltage output of the first inverter is approximately 25 kHz and the frequency of the time varying voltage output of the second inverter is approximately 33 kHz.

* * * * *